(12) United States Patent
Abhishek et al.

(10) Patent No.: US 11,662,975 B2
(45) Date of Patent: May 30, 2023

(54) METHOD AND APPARATUS FOR TELECONFERENCE

(71) Applicant: TENCENT AMERICA LLC, Palo Alto, CA (US)

(72) Inventors: Rohit Abhishek, San Jose, CA (US); Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 41 days.

(21) Appl. No.: 17/327,400

(22) Filed: May 21, 2021

(65) Prior Publication Data

US 2022/0109758 A1 Apr. 7, 2022

Related U.S. Application Data

(60) Provisional application No. 63/124,261, filed on Dec. 11, 2020, provisional application No. 63/088,300, filed on Oct. 6, 2020.

(51) Int. Cl.
*G06F 3/16* (2006.01)
*G10L 19/008* (2013.01)
(Continued)

(52) U.S. Cl.
CPC ............ *G06F 3/165* (2013.01); *G10L 19/008* (2013.01); *H04L 65/403* (2013.01); *H04L 65/70* (2022.05);
(Continued)

(58) Field of Classification Search
CPC ....... G06F 3/165; H04L 65/403; H04L 65/70; G10L 19/008; H04M 3/568; H04R 5/04
(Continued)

(56) References Cited

U.S. PATENT DOCUMENTS 10,819,953 B1 * 10/2020 Lovitt .................... G06F 16/487
10,992,795 B2 * 4/2021 Coffman ........... H04M 1/72442
(Continued)

FOREIGN PATENT DOCUMENTS

GB 2574238 A 12/2019

OTHER PUBLICATIONS

"Information technology—Coded representation of immersive media—Part 2: Omnidirectional MediA Format (OMAF) $2^{nd}$ Edition", DIS stage, ISO 23090-2:2020(E) ISO TC 1/SC 29/WG 11, Secretariat: IPSCJ (306 pages).

(Continued)

*Primary Examiner* — Thjuan K Addy
(74) *Attorney, Agent, or Firm* — ArentFox Schiff LLP

(57) ABSTRACT

A method for teleconference includes receiving a first media stream that carries a first audio, and a second media stream that carries a second audio, and receiving a first audio weight for weighting the first audio and a second audio weight for weighting the second audio. The first audio weight and the second audio weight are different from each other and determined based on at least one of (i) content of the first audio and content of the second audio or (ii) received customization parameters. The method further includes generating a mixed audio by combining a weighted first audio based on the first audio weight and a weighted second audio based on the second audio weight.

19 Claims, 7 Drawing Sheets

(51) Int. Cl.
    *H04L 65/403* (2022.01)
    *H04M 3/56* (2006.01)
    *H04R 5/04* (2006.01)
    *H04L 65/70* (2022.01)
    *H04N 19/51* (2014.01)

(52) U.S. Cl.
    CPC .............. *H04M 3/568* (2013.01); *H04R 5/04* (2013.01); *H04N 19/51* (2014.11)

(58) Field of Classification Search
    USPC ............. 379/202.01, 201.01, 204.01, 203.01
    See application file for complete search history.

(56) References Cited

U.S. PATENT DOCUMENTS

| | | |
|---|---|---|
| 2009/0086013 A1 | 4/2009 | Thapa |
| 2009/0326960 A1 | 12/2009 | Breebaat |
| 2015/0146889 A1 | 5/2015 | Hetherington et al. |
| 2018/0091648 A1 | 3/2018 | Hughes |

OTHER PUBLICATIONS

"ITT4RT Permanent Document—Requirements, Working Assumptions and Potential Solutions", Intel, Nokia Corporation (ITT4RT Co-Rapporteurs), 3GPP TSG SA4Meeting #109e, Online Meeting, May 20-Jun. 3, 2020, S4-200840 (44 pages).

International Search Report Issued in Application No. PCT/US2021/038370 dated Sep. 23, 2021, (22 pages).

Supplementary European Search Report dated Nov. 29, 2022 in Application No. 21878161.5, 8 pages.

\* cited by examiner

METHOD AND APPARATUS FOR TELECONFERENCE

INCORPORATION BY REFERENCE

This present disclosure claims the benefit of priority to U.S. Provisional Application No. 63/088,300, "NETWORK BASED MEDIA PROCESSING FOR AUDIO AND VIDEO MIXING FOR TELECONFERENCING AND TELEPRESENCE FOR REMOTE TERMINALS" filed on Oct. 6, 2020, and U.S. Provisional Application No. 63/124,261, "AUDIO MIXING METHODS FOR TELECONFERENCING AND TELEPRESENCE FOR REMOTE TERMINALS" filed on Dec. 11, 2020. The entire disclosures of the prior applications are hereby incorporated by reference in their entirety.

TECHNICAL FIELD

The present disclosure describes embodiments generally related to teleconference.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Teleconference systems allow users, at two or more remote locations, to communicate interactively with each other via media streams, such as video streams, audio streams, or both. Some teleconference systems also allow users to exchange digital documents, such as images, text, video, applications, and the like.

SUMMARY

Aspects of the disclosure provide methods and apparatuses for teleconference. In some examples, an apparatus for teleconference includes processing circuitry. Processing circuitry of a first device (e.g., user device or a server for network based media processing) receives, from a second device, a first media stream that carries a first audio, and a second media stream that carries a second audio. The processing circuitry receives, from the second device, a first audio weight for weighting the first audio and a second audio weight for weighting the second audio, and generates, a mixed audio by combining a weighted first audio based on the first audio weight and a weighted second audio based on the second audio weight.

In some embodiments, the first device is a user device. The first device can play, through a speaker associated with the first device, the mixed audio.

In an example, the first device sends customization parameters to the second device for customizing the first audio weight and the second audio weight based on the customization parameters.

In some examples, the first audio weight and the second audio weight are determined by the second device based on sound intensities of the first audio and the second audio.

In some examples, the first audio and the second audio are overlay audios, and the processing circuitry receives the first audio weight and the second audio weight that are determined by the second device based on overlay priorities of the first audio and the second audio.

In some examples, the first audio weight and the second audio weight are adjusted by the second device based on a detection of an active speaker.

In some examples, the first media stream includes immersive media content, the second media stream includes overlay media content, and the first audio weight is different from the second audio weight.

In some embodiments, the first device is a network based media processing device. The processing circuitry encodes the mixed audio into a third media stream, and transmits, via interface circuitry of the device, the third media stream to a user device. In some examples, the processing circuitry transmits, via interface circuitry, the third media stream and a fourth media stream including immersive media content. The third media stream is an overlay to the fourth media stream.

According to some aspects of the disclosure, processing circuitry of a first device (e.g., server device for network based media processing) receives a first media stream that carries first media content of a teleconference session and a second media stream that carries second media content of the teleconference session. The processing circuitry generates third media content that mixes the first media content and the second media content; and transmits, via transmitting circuitry, a third media stream that carries the third media content to a second device.

In some embodiments, the processing circuitry of the first device mixes a first audio in the first media content with a second audio in the second media content to generate a third audio based on a first audio weight assigned to the first audio and a second audio weight assigned to the second audio. In some examples, the first audio weight and the second audio weight are received from a host device that sends the first media stream and the second media stream. In some examples, the first device can determine the first audio weight and the second audio weight.

In some examples, the first media stream is an immersive media stream and the second media stream is an overlay media stream, the processing circuitry of the first device, mixes the first audio with the second audio based on the first audio weight and the second audio weight that are of different values.

In some examples, the first media stream and the second media stream are overlay media streams, the processing circuitry of the first device mixes the first audio with the second audio based on the first audio weight and the second audio weight of an equal value.

In some examples, the first media stream and the second media stream are overlay media streams, the processing circuitry of the first device mixes the first audio with the second audio based on the first audio weight and the second audio weight that are associated with overlay priorities of the first media stream and the second media stream.

According to some aspects of the disclosure, a first device (e.g., a host device that generates immersive media content) can transmit to a second device, a first media stream that carries a first audio and a second media stream that carries a second audio. The first device can determine a first audio weight for weighting the first audio and a second audio weight for weighting the second audio and transmit, to the second device, the first audio weight and the second audio weight for mixing the first audio and the second audio.

In some examples, the first device receives customization parameters based on session description protocol and determines the first audio weight and the second audio weight based on the customization parameters.

In some examples, the first device determines the first audio weight and the second audio weight based on sound intensities of the first audio and the second audio.

In some examples, the first audio and the second audio are overlay audios, and the first device determines the first audio weight and the second audio weight based on overlay priorities of the first audio and the second audio.

In some examples, the first device determines the first audio weight and the second audio weight based on a detection of an active speaker in one of the first audio and the second audio.

In some examples, the first media stream includes immersive media content, the second media stream includes overlay media content. The first device determines different values for the first audio weight and the second audio weight.

Aspects of the disclosure also provide a non-transitory computer-readable medium storing instructions which when executed by a computer for teleconference cause the computer to perform the method for teleconference.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Aspects of the present disclosure provide techniques of media mixing, such as audio mixing, video mixing and the like for teleconference. In some examples, the teleconference can be audio teleconference, and the participants in the teleconference communicate via audio streams. In some examples, the teleconference is a video conference, and the participants in the teleconference can communicate via media streams that can include video and/or audio. In some examples, the media mixing is performed by a network based media processing element, such as a server device, and the like. In some examples, the media mixing is performed by an end user device (also referred to as user device).

Figure 1:
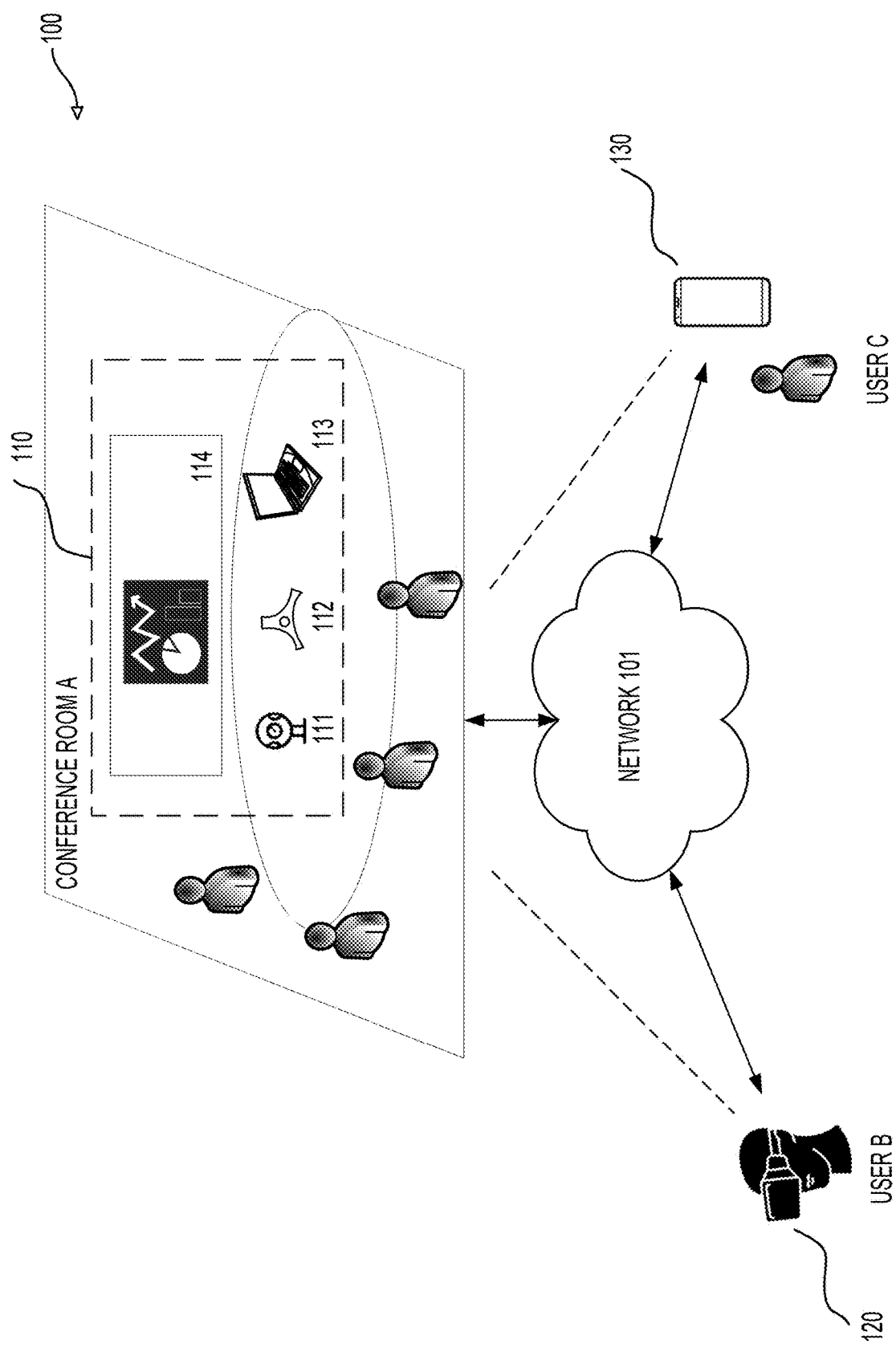
FIG. 1 shows a teleconference system according to some examples of the disclosure.
Figure 2:
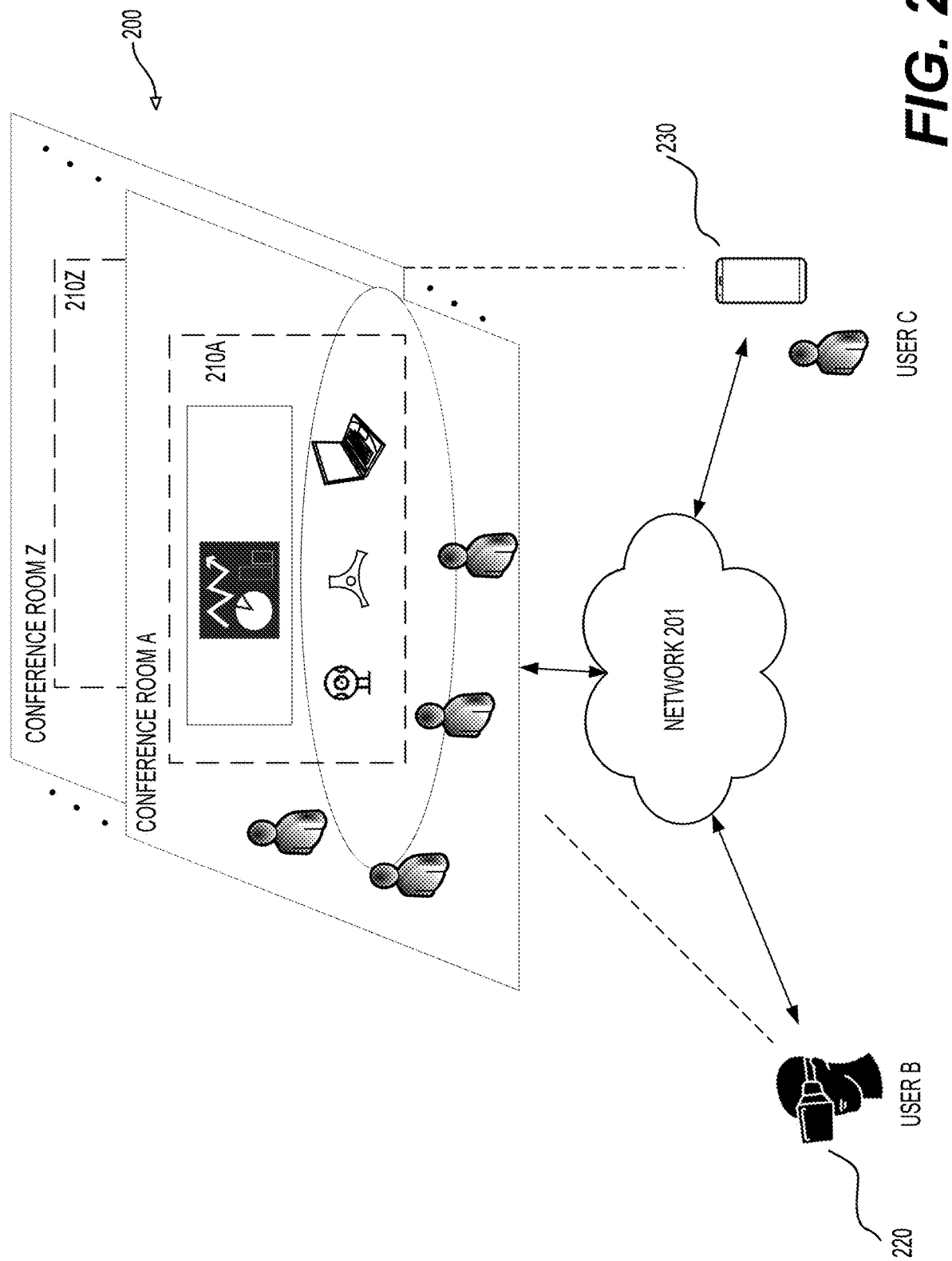
FIG. 2 shows another teleconference system according to some examples of the disclosure.
Figure 3:
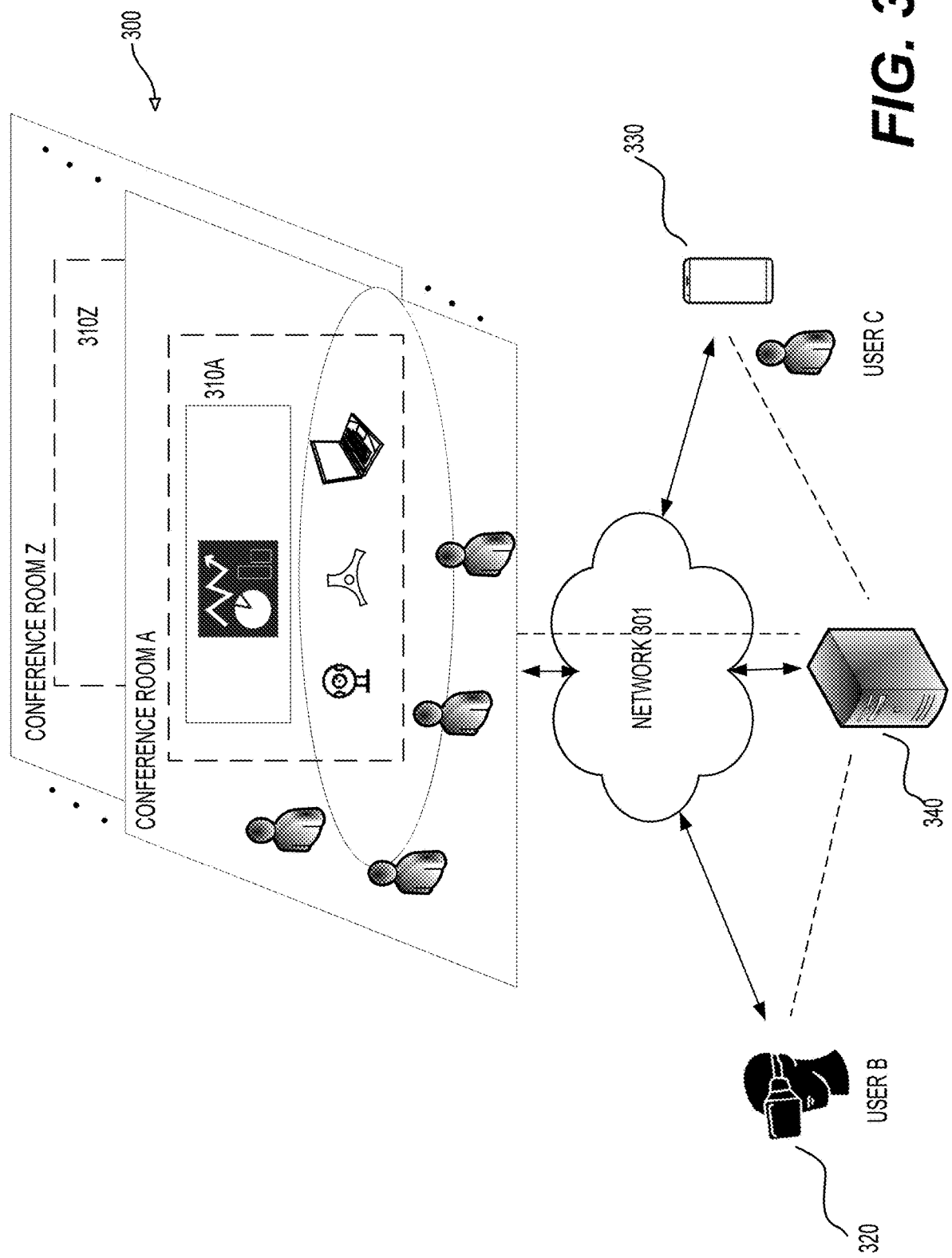
FIG. 3 shows another teleconference system according to some examples of the disclosure.

According to some aspects of the disclosure, the media mixing techniques can be performed in various teleconference systems. FIG. 1-FIG. 3 show some teleconference systems.

FIG. 1 shows a teleconference system (100) according to some examples of the disclosure. The teleconference system (100) includes a sub system (110) and a plurality of user devices, such as user devices (120) and (130). The sub system (110) is installed at a location, such as conference room A. Generally, the sub system (110) is configured to have a relatively higher bandwidth than the user devices (120) and (130) and can provide a host service of a teleconference session (also referred to as a teleconference call). The sub system (110) can enable users or participants in the conference room A to participate in the teleconference session, and can enable some remote users, such as user B of the user device (120) and user C of the user device (130) to participate in the teleconference session from remote locations. In some examples, the sub system (110) and the user devices (120) and (130) are referred to as terminals in the teleconference session.

In some embodiments, the sub system (110) includes various audio, video and control components that are suitable for a conference room. The various audio, video and control components can be integrated into a device, or can be distributed components that are coupled together via suitable communication technologies. In some examples, the sub system (110) includes wide-angle camera (111), such as a fisheye camera, an omnidirectional camera and the like that has a relatively wide field of view. For example, an omnidirectional camera can be configured to have a field of view that covers approximately an entire sphere, and a video taken by the omnidirectional camera can be referred to as omnidirectional video or 360-degree video.

Further, in some examples, the sub system (110) includes a microphone (112), such as an omnidirectional (also referred to as no directional) microphone that can capture sound waves from approximately any direction. The sub system (110) can include a display screen (114), a speaker device, and the like to enable users in the conference room A to play multimedia corresponding to video and audio of users at locations other than the conference room A. In an example, the speaker device can be integrated with the microphone (112) or can be a separate component (not shown).

In some examples, the sub system (110) includes a controller (113). While a laptop computing device is shown in FIG. 1 as the controller (113), other suitable device, such as desktop computer, a tablet computer, and the like can be used as the controller (113). It is also noted, in an example, the controller (113) can be integrated together with other component in the sub system (110).

The controller (113) can be configured to perform various control functions of the sub system (110). For example, the controller (113) can be used to initiate a teleconference session, and manage communications between the sub system (110) and the user devices (120) and (130). In an example, the controller (113) can encode video and/or audio captured at the conference room A (e.g., captured by the camera (111) and the microphone (112)) to generate a media stream to carry the video and/or audio, and can cause the media stream to be transmitted to the user devices (120) and (130).

Further, in some examples, the controller (113) can receive, from each of the user devices in the teleconference system (100) (e.g., user devices (120) and (130)), media streams that carry audio and/or video captured at the respective user devices. The controller (113) can address and transmit received media streams to the other user devices in the teleconference system (100). For example, the controller (113) can receive a media stream from the user device (120), address and transmit the media stream to the user device (130), and can receive another media stream from the user device (130), address and transmit the other media stream to the user device (120).

Further, in some examples, the controller (113) can determine suitable teleconference parameters, such as audio, video mixing parameters and the like, and transmit the teleconference parameters to the user devices (120) and (130).

In some examples, the controller (113) can cause a display of a user interface on a screen, such as the display screen (114), a screen of the laptop computing device, and the like to facilitate user inputs in the conference room A.

Each of the user devices (120) and (130) can be any suitable teleconferencing-enabled equipment, such as a desktop computer, a laptop computer, a tablet computer, a wearable device, an handheld device, a smart phone, a mobile-type device, an embedded-type device, a game console, a gaming device, a personal data assistant (PDA), a telecommunication device, a global positioning system ("GPS") device, a virtual reality ("VR") device, an augmented reality (AR) device, an implanted computing device, an automotive computer, a network-enabled television, an Internet of Things ("IoT") device, a work station, a media player, a personal video recorders (PVR), a set-top box, a camera, an integrated component (e.g., a peripheral device) for inclusion in a computing device, an appliance, or any other sort of computing device.

In the FIG. 1 example, the user device (120) includes wearable multimedia components to allow a user, such as the user B, to participate in a teleconference session. For example, the user device (120) includes a head mounted display (HMD) that can be worn on the head of the user B. The HMD can include display optic in front of one or two eyes of the user B to play video. In another example, the user device (120) includes a headset (not shown) that can be worn by the user B. The headset can include microphone to capture user voice and include one or two earpieces for outputting audio sound. The user device (120) also includes suitable communication components (not shown) that can transmit and/or receive media streams.

In the FIG. 1 example, the user device (130) can be a mobile device, such as a smart phone and the like that integrates communication components, imaging components, audio components, and the like together to allow a user, such as the user C, to participate in a teleconference session.

In the FIG. 1 example, the sub system (110), the user device (120) and the user device (130) include suitable communication components (not shown) that can interface with a network (101). The communication components may include one or more network interface controllers (NICs) or other types of transceiver circuitry to send and receive communications and/or data over a network, such as the network (101), and the like.

The network (101) may include, for example, public networks such as the Internet, private networks such as an institutional and/or personal intranet, or some combination of private and public networks. The network (108) may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, 5G and so forth) or any combination thereof. The network (101) may utilize communications protocols, including packet-based and/or datagram-based protocols such as Internet protocol ("IP"), transmission control protocol ("TCP"), user datagram protocol ("UDP"), or other types of protocols. Moreover, the network (101) may also include a number of devices that facilitate network communications and/or form a hardware basis for the networks, such as switches, routers, gateways, access points, firewalls, base stations, repeaters, backbone devices, and the like. In some examples, the network (101) may further include devices that enable connection to a wireless network, such as a wireless access point ("WAP").

In the FIG. 1 example, the sub system (110) can host a teleconference session using peer to peer technologies. For example, after the user device (120) joints the teleconference session, the user device (120) can suitably address packets (e.g., using IP address for the sub system (110)) and transmit the packets to the sub system (110), and the sub system (110) can suitably address packets (e.g., using IP address for the user device (120)), and transmits packets to the user device (120). The packets can carry various information and data, such as media streams, acknowledgements, control parameters, and the like.

In some examples, the teleconference system (100) can provide teleconference sessions of immersive teleconferencing. For example, during a teleconference session, the sub system (110) is configured to generate immersive media, such as an omnidirectional video/audio using an omnidirectional camera and/or an omnidirectional microphone. In an example, the HMD in the user device (120) can detect head movements of the user B, and determine a viewport orientation of the user B based on the head movements. The user device (120) can send the viewport orientation of the user B to the sub system (110), and the sub system (110) can, in turn, send a viewport dependent stream, such as a video stream that is tailored based on the viewport orientation of the user B (a media stream carrying a video that is tailored based on the viewport orientation of the user B), an audio stream that is tailored based on the viewport orientation of the user B (a media stream carrying a video that is tailored based on the viewport orientation of the user B), and the like to the user device (120) for playing at the user device (120).

In another example, the user C can use the user device (130) to enter a viewport orientation of the user C (e.g., using touch screen of the smart phone). The user device (130) can send the viewport orientation of the user C to the sub system (110), and the sub system (110) can, in turn, send a viewport dependent stream, such as a video stream that is tailored based on the viewport orientation of the user C (a media stream carrying a video that is tailored based on the viewport orientation of the user C), an audio stream that is tailored based on the viewport orientation of the user C (a media stream carrying an audio that is tailored based on the viewport orientation of the user C), and the like to the user device (130) for playing at the user device (130).

It is noted that, during a teleconference session, the viewport orientations of the user B and/or user C may vary. The change of the viewport orientations can be informed to the sub system (110), and the sub system (110) can adjust the viewport orientation in respective viewport dependent streams that are respectively sent to the user device (120) and the user device (130).

For ease of description, immersive media is used to refer the wide angle media, such as an omnidirectional video, an omnidirectional audio, and to refer the viewport dependent media that is generated based on the wide angle media. It is noted that, in the present disclosure, 360-degree media, such as 360-degree video, 360-degree audio and the like is used to illustrate techniques for teleconferencing, the techniques of teleconferencing can be used on immersive media of less than 360-degree.

FIG. 2 shows another teleconference system (200) according to some examples of the disclosure. The teleconference system (200) includes multiple sub systems, such as sub systems (210A)-(210Z) that are respectively installed at conference room A to conference room Z and a plurality of user devices, such as user devices (220) and (230). One of the sub systems (210A)-(210Z) can initiate a teleconference session and enable other sub systems and user devices such as the user device (220) and the user device (230) to join the teleconference session, thus users, such as users in the conference rooms A-Z, user B of the user device (220) and user C of the user device (230) can participate in the teleconference session. In some examples, the sub systems (210A)-(210Z) and the user devices (220) and (230) are referred to as terminals in the teleconference session.

In some embodiments, each of the sub systems (210A)-(210Z) operates similarly to the sub system (110) described above. Further, each of the sub system (210A)-(210Z) utilizes certain components that are identical or equivalent to those used in the sub system (110); the description of these components has been provided above and will be omitted here for clarity purposes. It is noted that the sub systems (210A)-(210Z) can be configured differently from each other.

The user devices (220) and (230) are similarly configured as the user devices (120) and (130) described above and the network (201) is similarly configured as the network (101). The description of these components has been provided above and will be omitted here for clarity purposes.

In some embodiments, one of the sub systems (210A)-(210Z) can initiate a teleconference session, and the other of the sub systems (210A)-(210Z) and the user devices (220) and (230) can join the teleconference session.

According to an aspect of the disclosure, during a teleconference session of immersive teleconferencing, multiple sub systems in the sub systems (210A)-(210Z) can generate respective immersive media, and the user devices (220) and (230) can select one of the sub systems (210A)-(210Z) to provide the immersive media. Generally, the sub systems (210A)-(210Z) are configured to have relatively high bandwidth and can respectively operate as a host for providing the immersive media.

In an example, after the user device (220) joints the teleconference session, the user device (220) can select one of the sub systems (210A)-(210Z), such as the sub system (210A), as a host of the immersive media. The user device (220) can address packets and transmit packets to the sub system (210A) and the sub system (210A) can address packets and transmit packets to the user device (220). The packets can include any suitable information/data, such as media stream, control parameters and the like. In some examples, the sub system (210A) can send tailored media information to the user device (220). It is noted that the user devices (220) can change the selection of the sub systems (210A)-(210Z) during a teleconference session.

In an example, the HMD in the user device (220) can detect head movements of the user B, and determine a viewport orientation of the user B based on the head movements. The user device (220) can send the viewport orientation of the user B to the sub system (210A), and the sub system (210A) can, in turn, send a viewport dependent media stream, such as a video stream that is tailored based on the viewport orientation of the user B, an audio stream that is tailored based on the viewport orientation of the user B, and the like to the user device (220) for playing at the user device (220).

In another example, after the user device (230) joints the teleconference session, the user device (230) can select one of the sub systems (210A)-(210Z), such as the sub system (210Z), as a host of the immersive media. The user device (230) can address packets and transmit packets to the sub system (210Z) and the sub system (210Z) can address packets and transmit packets to the user device (230). The packets can include any suitable information/data, such as media stream, control parameters and the like. In some examples, the sub system (210Z) can send tailored media information to the user device (230). It is noted that the user devices (230) can change the selection of the sub systems (210A)-(210Z) during a teleconference session.

In another example, the user C can use the user device (230) to enter a viewport orientation of the user C (e.g., using touch screen of the smart phone). The user device (230) can send the viewport orientation of the user C to the sub system (210Z), and the sub system (210Z) can, in turn, send a viewport dependent media stream, such as a video stream that is tailored based on the viewport orientation of the user C, an audio stream that is tailored based on the viewport orientation of the user C, and the like to the user device (230) for playing at the user device (230).

It is noted that, during a teleconference session, the viewport orientations of a user (e.g., the user B, user C) may vary. For example, the change of the viewport orientation of the user B can be informed to the selected sub system by the user B, and the selected sub system by the user B can adjust the viewport orientation in the viewport dependent stream that is sent to the user device (220) accordingly.

For ease of description, immersive media is used to refer the wide angle media, such as an omnidirectional video, an omnidirectional audio, and to refer the viewport dependent media that is generated based on the wide angle media. It is noted that, in the present disclosure, 360-degree media, such as 360-degree video, 360-degree audio and the like is used to illustrate techniques for teleconferencing, the techniques of teleconferencing can be used on immersive media of less than 360-degree.

FIG. 3 shows another teleconference system (300) according to some examples of the disclosure. The teleconference system (300) includes a network based media processing server (340)), multiple sub systems, such as sub systems (310A)-(310Z) that are respectively installed at conference room A to conference room Z, and a plurality of user devices, such as user devices (320) and (330). The network based media processing server (340) can setup a teleconference session and enable the sub systems (310A)-(310Z) and user devices, such as the user devices (320) and (330) to join the teleconference session, thus users, such as users in the conference rooms A-Z, user B of the user device (320) and user C of the user device (330) can participate in the teleconference session.

In some examples, the sub systems (310A)-(310Z) and the user devices (320) and (330) are referred to as terminals in the teleconference session and network based media processing server (340) can bridge the terminals in the teleconference session. In some examples, the network based media processing server (340) is referred to as media aware networking element. The the network based media processing server (340) can perform media resource functions (MRF) and can perform media control functions as a media control unit (MCU).

In some embodiments, each of the sub systems (310A)-(310Z) operates similarly to the sub system (110) described above. Further, each of the sub system (310A)-(310Z) utilizes certain components that are identical or equivalent to those used in the sub system (110); the description of these components has been provided above and will be omitted here for clarity purposes. It is noted that the sub systems (310A)-(310Z) can be configured differently from each other.

The user devices (320) and (330) are similarly configured as the user devices (320) and (330) described above and the network (301) is similarly configured as the network (101). The description of these components has been provided above and will be omitted here for clarity purposes.

In some examples, the network based media processing server (340) can initiate a teleconference session. For example, one of the sub systems (310A)-(310Z) and the user devices (320) and (330) can access the network based media processing server (340) to initiate a teleconference session. The sub systems (310A)-(310Z) and the user devices (320) and (330) can join the teleconference session. Further, the network based media processing server (340) is configured to provide media related functions for bridging terminals in the teleconference session. For example, the sub systems (310A)-(310Z) can respectively address packets that carry respective media information, such as video and audio, and transmit the packets to the network based media processing server (340). It is noted that the media information sent to the network based media processing server (340) is viewport independent. For example, the sub systems (310A)-(310Z) can send respective videos, such as the entire 360-degree videos, to the network based media processing server (340). Further, the network based media processing server (340) can receive viewport orientation from the user devices (320) and (330), perform media processing to tailor the media, and send the tailored media information to the respective user devices.

In an example, after the user device (320) joints the teleconference session, the user device (320) can address packets and transmit the packets to the network based media processing server (340), and the network based media processing server (340) can address packets and transmit the packets to the user device (320). The packets can include any suitable information/data, such as media stream, control parameters and the like. In an example, the user B can use the user device (320) to select a conference room in order to view the video from a sub system in the conference room. For example, the user B can use the user device (320) to select the conference room A in order to view the captured video from the sub system (310A) that is installed in the conference room A. Further, the HMD in the user device (320) can detect head movements of the user B, and determine a viewport orientation of the user B based on the head movements. The user device (320) can send the selection of the conference room A and the viewport orientation of the user B to the network based media processing server (340), and the network based media processing server (340) can process the media sent from the sub system (310A) and send a viewport dependent stream, such as a video stream that is tailored based on the viewport orientation of the user B, an audio stream that is tailored based on the viewport orientation of the user B, and the like to the user device (320) for playing at the user device (320). In some examples, when the user device (320) selects the conference room A, the user device (320), the sub system (310A) and the network based media processing server (340) can communicate with each other based on session description protocol (SDP).

In another example, after the user device (330) joints the teleconference session, the user device (330) can address packets and transmit the packets to the network based media processing server (340), and the network based media processing server (340) can address packets and transmit the packets to the user device (330). The packets can include any suitable information/data, such as media stream, control parameters and the like. In some examples, the network based media processing server (340) can send tailored media information to the user device (330). For example, the user C can use the user device (330) to enter a selection of a conference room, such as conference room Z, and a viewport orientation of the user C (e.g., using touch screen of the smart phone). The user device (330) can send the selection information of the conference room Z and the viewport orientation of the user C to the network based media processing server (340), and the network based media processing server (340) can process the media sent from the sub system (310Z) and send a viewport dependent stream, such as a video stream that is tailored based on the viewport orientation of the user C, an audio stream that is tailored based on the viewport orientation of the user C, and the like to the user device (330) for playing at the user device (330). In some examples, when the user device (330) selects the conference room Z, the user device (330), the sub system (310Z) and the network based media processing server (340) can communicate with each other based on session description protocol (SDP).

It is noted that, during a teleconference session, the viewport orientations of a user (e.g., the user B, user C) may vary. For example, the change of the viewport orientation of the user B can be informed to the network based media processing server (340) by the user B, and the network based media processing server (340) can adjust the viewport orientation in the viewport dependent stream that is sent to the user device (320) accordingly.

For ease of description, immersive media is used to refer the wide angle media, such as an omnidirectional video, an omnidirectional audio, and to refer the viewport dependent media that is generated based on the wide angle media. It is noted that, in the present disclosure, 360-degree media, such as 360-degree video, 360-degree audio and the like is used to illustrate techniques for teleconferencing, the techniques of teleconferencing can be used on immersive media of less than 360 degrees.

It is noted that conference room selection can be changed during a teleconference session. In an example, a user device, such as the user device (320), the user device (330) and the like can trigger a switching from one conference room to another conference room based on an active speaker. For example, in response to the active speaker being in the conference room A, the user device (330) can determine to switch the selection of the conference room to the conference room A, and send the selection of the conference room A to the network based media processing server (340). Then, the network based media processing server (340) can process the media sent from the sub system (310A) and send a viewport dependent stream, such as a video stream that is tailored based on the viewport orientation of the user C, an audio stream that is tailored based on the viewport orientation of the user C, and the like to the user device (330) for playing at the user device (330).

In some examples, the network based media processing server (340) can pause receiving a video stream from any conference room which does not have any active users. For example, the network based media processing server (340) determines that the conference room Z is without any active user, then the network based media processing server (340) can pause receiving the video stream the sub system (310Z).

In some examples, the network based media processing server (340) can include distributed computing resources and can communicate with the sub systems (310A)-(310Z) and the user devices (320) and (330), via the network (301).

In some examples, the network based media processing server (340) may be an independent system that is tasked with managing aspects of one or more teleconference sessions.

In various examples, the network based media processing server (340) may include one or more computing devices that operate in a cluster or other grouped configuration to share resources, balance load, increase performance, provide fail-over support or redundancy, or for other purposes. For instance, the network based media processing server (340) may belong to a variety of classes of devices such as traditional server-type devices, desktop computer-type devices, and/or mobile-type devices. Thus, although illustrated as a single type of device—a server-type device—the network based media processing server (340) may include a diverse variety of device types and are not limited to a particular type of device. The network based media processing server (340) may represent, but are not limited to, server computers, desktop computers, web-server computers, personal computers, mobile computers, laptop computers, tablet computers, or any other sort of computing device.

According to an aspect of the disclosure, the network based media processing server (340) can perform certain media functions in order to alleviate processing burdens at the terminals, such as the user device (320), the user device (330) and the like. For example, the user device (320) and/or the user device (330) may have limited media processing capacity or may have difficulty in encoding and rendering multiple video streams, the network based media processing server (340) can perform the media processing, such as decoding/encoding audio and video streams and the like, to offload the media processing in the user devices (320) and (330). In some examples, the user devices (320) and (330) are battery powered devices, and when the media processing has been offloaded from the user devices (320) and (330) to the network based media processing server (340), the battery life of the user devices (320) and (330) can be increased.

Media streams from different sources can be processed and mixed. In some examples, such as in international organization for standardization (ISO) 23090-2, overlay can be defined as a second media rendered over a first media. According to an aspect of the disclosure, for a teleconference session of immersive teleconferencing, additional media content (e.g., video and/or audio) can be overlaid on the immersive media content. The additional media (or media content) can be referred to as overlay media (or overlay media content) to the immersive media (or immersive media content). For example, overlay content can be a piece of visual/audio media rendered over omnidirectional video or image item or over a viewport.

Using FIG. 2 as an example, when a presentation is shared by a participant in conference room A, besides being displayed by the sub system (210A) in the conference room A, the presentation is also broadcasted as a stream (also referred to as overlay stream) to other participant parties, such as the sub system (210Z), the user device (220), the user device (230), and the like. For example, the user device (220) selects the conference room A, and the sub system (210A) can transmit a first stream of an immersive media, such as 360-degree video captured by the sub system (210A) and the overlay stream to the user device (220). At the user device (220), the presentation can be overlaid on top of 360-degree video captured by the sub system (210A). In another example, the user device (230) selects the conference room Z, and the sub system (210Z) can transmit a first stream carrying an immersive media, such as 360-degree video captured by the sub system (210Z) and the overlay stream to the user device (220). At the user device (230), the presentation can be overlaid on top of 360-degree video captured by the sub system (210Z). It is noted that the presentation can be overlaid on top of 2D video in some examples. It is noted that the presentation can be overlaid on top of 2D video in some examples.

In another scenario, the user C can be a remote speaker, and a media stream (referred to as an overlay stream) carrying audio corresponding to the speech of the user C can be sent from the user device (230) to, for example, the sub system (210Z) and broadcasted to other participant parties, such as the sub system (210A). For example, the user device (220) selects the conference room A, and the sub system (210A) can transmit a first stream of an immersive media, such as 360-degree video captured by the sub system (210A) and the overlay stream to the user device (220). At the user device (220), the audio corresponding to the speech of the user U can be overlaid with 360-degree video captured by the sub system (210A). The media stream carrying the audio corresponding to the speech of the user C can be referred to as the overlay stream in an example, and the audio can be referred to as overlay audio in an example.

Some aspects of the present disclosure provide techniques for audio and video mixing, and more specifically techniques for combining audio and/or video of multiple media streams, such as an immersive stream and one or more overlay streams. According to an aspect of the disclosure, the audio and/or video mixing can be performed by a network based media processing element, such as the network based media processing server (340) and the like and can be performed by an end user device, such as the user device (120), the user device (130), the user device (220), the user device (230), the user device (320), the user device (330), and the like.

In the FIG. 1 example, the sub system (110) is referred as a sender that can send multiple media streams respectively carrying media (audio and/or video), and the user devices (120) and (130) are referred to as receivers. In the FIG. 2 example, the sub systems (210A)-(210Z) are referred as senders that can send multiple media streams respectively carrying media (audio and/or video), and the user devices (220) and (230) are referred to as receivers. In the FIG. 3 example, the network based media processing server (340) is referred to as a sender that can send multiple media streams respectively carrying media (audio and/or video), and the user devices (320) and (330) are referred to as receivers.

According to some aspects of the disclosure, mixing levels, such as audio weights, can be assigned to the overlay stream and immersive stream in an immersive teleconference for audio mixing. Further, in some embodiments, the audio weights can be suitable adjusted, and the adjusted audio weight can be used for audio mixing. In some examples, audio mixing is also referred to as audio downmixing.

In some examples, such as immersive teleconferencing, when overlay media is superimposed on the immersive media, overlay information, such as overlay source, overlay rendering type, overlay rendering properties, user interaction properties, and the like may need to be provided. In some examples, the overlay source specifies the media, such as the image, the audio or the video being used as an overlay; the overlay rendering type describes if the overlay is anchored relative to the viewport or sphere; and the overlay rendering properties can include opacity level, transparent level and the like.

In the FIG. 2 example, multiple conference rooms with respective omnidirectional cameras can participate in a teleconference session. A user, such as the user B, can choose, via the user device (220), a source of an immersive media, such as one of the multiple conference rooms with respective omnidirectional cameras. To add additional media, such as audio or video with the immersive media, the additional media can be sent separate from the immersive media, as an overlay stream that carries the additional media, to the user device (220). The immersive media can be sent as a stream (referred to as immersive stream) that carries the immersive media. The user device (220) can receive the immersive stream and the overlay stream, and can overlay additional media with the immersive media.

According to an aspect of the disclosure, a user device, such as the user device (220), the user device (230), and the like, can receive multiple media streams that carry respective audios in a teleconference session. The user device can decode the media stream to retrieve the audios and mix the audios decoded from the media streams. In some examples, during a teleconference of immersive teleconferencing, the sub system in a selected conference room can send the multiple media streams and can provide mixing parameters for the audios carried in the multiple media streams. In an example, the user B chooses, via the user device (220), can select the conference room A to receive an immersive stream that carries the 360-degree immersive video captured by the sub system (210A). The sub system (210A) can send the immersive stream with one or more overlay streams to the user device (220). The sub system (210A) can provide mixing levels for audios carried in the immersive stream and the one or more overlay streams, for example based on session description protocol (SDP). It is noted that the sub system (210A) may also update the mixing levels of the audios during the teleconference session, and send signals for informing the updated mixing levels to the user device (220) based on the SDP.

In an example, the mixing levels for audio are defined using audio mixing weights. For example, the sub system (210A) that sends an immersive stream and overlay stream(s) that carry respective audios can determine audio mixing weights for the respective audios. In an example, the sub system (210A) determines default audio mixing weights based on sound intensities. Sound intensity can be defined as the power carried by sound waves per unit area in a direction perpendicular to the unit area. For example, a controller of the sub system (210A) can receive electrical signals that are indicative of the sound intensities of the respective audios and determine the default audio mixing weights based on the electrical signals, such as based on signal levels, power levels, and the like of the electrical signals.

In another example, the sub system (210A) determines the audio mixing weights based on overlay priority. For example, a controller of the sub system (210A) can detect, from the immersive stream and the overlay stream(s), a specific media stream that carries an audio of an active speaker. The controller of the sub system (210A) can determine a higher overlay priority to the specific media stream, and can determine a higher mixing weight for the audio carried by the specific media stream.

In another example, the end user can customize the overlay priority. For example, the user B can use the user device (220) to send customization parameters to the sub system (210A) based on SDP. The customization parameters can indicate, for example, a specific media stream that carries an audio to which the user B would like to focus. Then, the sub system (210A) can determine a higher overlay priority for the specific media stream, and can determine a higher mixing weight for the audio carried by the specific media stream.

In some embodiments, when overlay priority is used, a sender, such as the sub system (210A), may be informed about all the overlay of the other senders, such as the sub system (210Z), and the priorities of those overlays in the teleconference session and assigns the weights accordingly. Thus, when a user device switches to a different sub system, audio mixing weights can be determined properly.

In some embodiments, the audio mixing weights may be customized by an end user. In a scenario, an end user may want to listen or focus on one particular audio carried by a media stream. In another scenario, the quality of the downmixed audio by the default audio mixing weight is not tolerable for reasons such as variation in audio level, audio quality or poor signal to noise ratio (SNR) channels, then the audio mixing weights can be customized. In an example, the user B wants to focus on an audio from a specific media stream, then the user B may indicate using the user device (220), customization parameters for adjusting the audio mixing weights. For example, the customization parameters indicate an increase of audio mixing weight for the audio in the specific media stream. The user device (220) can send the customization parameters to the sender of the media streams, such as the sub system (210A) during the teleconference session based on SDP. Based on the customization parameters, the controller of the sub system (210A) can adjust the audio mixing weights to increase the audio mixing weight for the audio in the specific media stream, and the sub system (210A) can send the adjusted audio mixing weights to the user device (220). Thus, the user device (220) can mix audios based on the adjusted audio mixing weights.

It is also noted that, in some examples, a user device, such as the user device (120) the user device (130), the user device (220) the user device (230), the user device (320) the user device (330), and the like can overwrite the received audio mixing weights with different values due to the user's preference.

In the FIG. 3 example, multiple conference rooms with respective omnidirectional cameras can participate in a teleconference session. A user, such as the user B, can choose, via the user device (320), a source of an immersive media, such as one of the multiple conference rooms with respective omnidirectional cameras. To add additional media, such as audio or video with the immersive media, the additional media can be sent separate from the immersive media, as an overlay stream that carries the additional media, to the user device (320). In some embodiments, the network based media processing server (340) receives media streams from participant parties (e.g., sub systems (310A)-(310Z), the user devices (320) and (330) in a teleconference, processes the media streams and sends suitable processed media streams to the participant parties. For example, the network based media processing server (340) can send an immersive stream that carries an immersive media captured at the sub system (310A) and an overlay stream that carries an overlay media to the user device (320). The user device (320) can receive the immersive stream and the overlay stream, and can superimpose the overlay media with the immersive media in some embodiments.

According to an aspect of the disclosure, a user device, such as the user device (320), the user device (330), and the like, can receive multiple media streams that carry respective audios in a teleconference session. The user device can decode the media stream to retrieve the audios and mix the audios decoded from the media streams. In some examples, during a teleconference of immersive teleconferencing, the network based media processing server (340) can send the multiple media streams to end user devices. In an example, the user B, via the user device (320), can select the conference room A to receive an immersive stream that carries the 360-degree immersive video captured by the sub system (310A). According to an aspect of the disclosure, the audio mixing parameters, such as loudness can be defined by the sender of the immersive media or customized by end user. In some examples, the sub system (310A) can provide mixing levels for audio carried in the one or more overlay streams to the network based media processing server (340) for example via signals based on session description protocol (SDP). It is noted that sub system (310A) may also update the mixing levels of the audios during the teleconference session, and send signals for informing the updated mixing levels to the network based media processing server (340) based on the SDP.

In an example, the mixing levels for audio are defined using audio mixing weights. In an example, the sub system (310A) can determine the audio mixing weights, and send to the network based media processing server (340) based on SDP. In an example, the sub system (310A) determines default audio mixing weights based on sound intensities.

In another example, the sub system (310A) determines the audio mixing weights based on overlay priority. For example, the sub system (310A) can detect a specific media stream that carries an audio of an active speaker. The sub system (310A) can determine a higher overlay priority to the specific media stream, and can determine a higher mixing weight for the audio carried by the specific media stream.

In another example, the end user can customize the overlay priority. For example, the user B can use the user device (320) to send customization parameters to the sub system (310A) based on SDP. The customization parameters can indicate, for example, a specific media stream that carries an audio to which the user B would like to focus. Then, the sub system (310A) can determine a higher overlay priority for the specific media stream, and can determine a higher mixing weight for the audio carried by the specific media stream.

In some embodiments, when overlay priority is used, a sender, such as the sub system (310A), may be informed about all the overlay of the other senders, such as the sub system (310Z), and the priorities of those overlays in the teleconference session and assigns the weights accordingly. Thus, when a user device switches to a different sub system, audio mixing weights can be determined properly.

In some embodiments, the audio mixing weights may be customized by an end user. In a scenario, an end user may want to listen or focus on one particular audio carried by a media stream. In another scenario, the quality of the downmixed audio by the default audio mixing weight is not tolerable for reasons such as variation in audio level, audio quality or poor signal to noise ratio (SNR) channels, then the audio mixing weights can be customized. In an example, the user B wants to focus on an audio from a specific media stream, then the user B may indicate using the user device (320), customization parameters for adjusting the audio mixing weights. For example, the customization parameters indicate an increase of audio mixing weight for the audio in the specific media stream. The user device (320) can send the customization parameters to the sender of the media streams, such as the sub system (310A) during the teleconference session based on SDP. Based on the customization parameters, the sub system (310A) can adjust the audio mixing weights to increase the audio mixing weight for the audio in the specific media stream, and send the adjusted audio mixing weights to the network based media processing server (340). In an example, the network based media processing server (340) can send the adjusted audio mixing weights to the user device (320). Thus, the user device (320) can mix audios based on the adjusted audio mixing weights. In another example, the network based media processing server (340) can mix audios according to the adjusted audio mixing weights.

In an example, an immersive stream and one or more overlay streams are provided from, a sender, such as one of the sub systems (210A)-(210Z), one of the sub systems (310A)-(310Z), and N denotes the number of overlay streams, and is a positive integer. Further, a0 denotes the audio carried in the immersive stream; a1-aN respectively denote the audios carried in the overlay streams; and r0-rN respectively denote the audio mixing weights for a0-aN respectively. In some examples, the sum of the default audio mixing weights r0-RN is equal to one. A mixed audio (also referred to as audio output) can be generated according to Eq. 1:

$$\text{audio output} = r0 \times a0 + r1 \times a1 + \ldots + rn \times an \qquad \text{Eq. 1}$$

In some embodiments, the audio mixing can be performed by the end user devices, such as the user device (220), the user device (230), the user device (320), the user device (330) and the like based on the audio mixing weights, for example according to Eq. 1. An end user device may decode received media streams to retrieve the audios and mixed audios according to Eq. 1 to generate the audio output for playing.

In some embodiments, the audio mixing or portion of the audio mixing can be performed by MRF or MCU, for example by the network based media processing server (340). Referring to FIG. 3, in some examples, the network based media processing server (340) receives various media streams carrying audios. Further, the network based media processing server (340) can perform media mixing, such as audio mixing based on audio mixing weights. Using the sub system (310A) and the user device (330) as examples (e.g., the user device (330) selects the conference room A), when the user device (330) is in low power state or has limited media processing capability, the audio mixing or portion of the audio mixing can be offloaded to the network based media processing server (340). In an example, the network based media processing server (340) can receive media streams for sending to the user device (330) and audio mixing weights for mixing audios in the media streams. Then, the network based media processing server (340) can decode the media streams to retrieve the audios and mixed audios according to Eq. 1 to generate a mixed audio. It is noted that the network based media processing server (340) can suitably mix video portions of the media streams into a mixed video. The network based media processing server (340) can encode the mixed audio and/or the mixed video in another stream (referred to as a mixed media stream) and send the mixed media stream to the user device (330). The user device (330) can receive the mixed media stream, decode the mixed media stream to retrieve the mixed audio and/or mixed video and play the mixed audio/video.

In another example, the network based media processing server (340) receives an immersive media stream and multiple overlay media streams for providing media content to the user device (330) and audio mixing weights for mixing audios in the immersive media stream and multiple overlay media streams. When multiple overlay media streams need to be sent, the network based media processing server (340)

can decode the multiple overlay media streams to retrieve the audios and mix the audios, for example according to Eq. 2, to generate a mixed overlay audio:

$$\text{mixed overlay audio} = r1 \times a1 + \ldots + rn \times an \qquad \text{Eq. 2}$$

It is noted that the network based media processing server (340) can suitably mix video portions of the overlay media streams into a mixed overlay video. The network based media processing server (340) can encode the mixed overlay audio and/or the mixed overlay video in another stream (referred to as a mixed overlay media stream) and send the mixed overlay media stream with the immersive media stream to the user device (330). The user device (330) can receive the immersive media stream and the mixed media stream, decode the immersive media stream and the mixed media stream to retrieve the audio (a0) of the immersive media, the mixed overlay audio and/or mixed overlay video. Based on the audio (a0) of the immersive media and the mixed overlay audio, the user device (330) can generate the mixed audio (also referred to as audio output) for play according to, for example Eq. 3:

$$\text{audio output} = r0 \times a0 + \text{mixed overlay audio} \qquad \text{Eq. 3}$$

In an example, when there is no background noise or disturbance from any audios from the overlay media streams or the immersive media stream (the audio from the immersive media stream can be referred as background in some examples) or when the audio intensity level of all the media streams are about the same or the variance is relatively small, such as smaller than a predefined threshold value, audio mixing can be performed by adding audios retrieved from all the streams, such as the overlay media streams and the immersive media stream together (e.g., using equal mixing weights of 1 respectively) to generate an aggregated audio and the aggregated audio may be normalized (e.g., divided by the number of audios). It is noted that the audio mixing in this example, can be performed by an end user device, such as the user device (120), the user device (130), the user device (220), the user device (230), the user device (320), the user device (330), and the network based media processing server (340).

In some embodiments, the audio weights can be used to select a portion of the audios for mixing. In an example, when a large number of audios are aggregated and then normalized, it might be difficult to distinguish one audio stream from the other. Using the audio weights, a selected number of audios can be aggregated and then normalized. For example, when the total number of audio is 10, the audio weights for 5 selected audios can be 0.2 and the audio weights for 5 unselected audios can be 0. It is noted that the selection of audios may be based on the mixing weight defined by an algorithm or may be based on the overlay priority.

In some embodiments, the user device may choose to change the selection of the audios from media streams to be mixed by changing the respective audio mixing weights or even using a subset of media streams to retrieve audios and mix audios.

In some embodiments, when the variation in the sound intensity of the audios in the media streams is large, the audio mixing weights for the overlay audio and immersive audio may be set to the same level.

In some embodiments, a user device has limited resource capacity or has difficulty to distinguish between audios from different conference rooms, thus the number of audios to be downmixed may be limited. If such a limitation is applied, the sender device, such as the sub systems (210A)-(210Z), the network based media processing server (340) may select media streams to be audio downmixed based on the sound intensity or the overlay priority. It is noted that the user device can send customization parameters to change the selection during a teleconference session based on SDP.

In some scenarios, during a teleconference session, the person speaking/presenting needs to be in focus. Thus, the media stream with the audio of the speaking person can be assigned with a relatively large audio mixing weight, and the audio mixing weights for other audios in the other media streams can be reduced.

In some scenarios, when a remote user is presenting, and the immersive audio in the immersive media stream has background noise. The sender, such as such as the sub systems (210A)-(210Z), the network based media processing server (340) can reduce the audio mixing weight for the immersive audio to be smaller than the overlay audio associated with the remote user. Although this can be customized by an end user who is already in the session by reducing the audio weights during the teleconference session, changing the default audio mixing weight provided from the sender can allow a new remote user who just joins the conference to get the default audio mixing weights for the audio streams from the sender to downmix the audios with good sound quality.

In an embodiment, the audio mixing parameters, such as the audio mixing weights are defined by a sender device, such as the sub systems (310A)-(310Z), and the like, the sender device can determine the audio mixing weights to set audio streams to the same loudness level. The audio mixing parameters (audio mixing weights) can be transmitted from the sender device to the network based media processing server (340) via SDP signaling.

In another embodiment, the sender device, such as the sub systems (310A)-(310Z), and the like can set the audio mixing weight for the audio in the immersive media content to be higher than audio mixing weights for other overlay audios in the overlay media streams. In an example, overlay audios may have the same audio mixing weights. The audio mixing parameters (audio mixing weights) can be transmitted from the sender device to the network based media processing server (340) via SDP signaling.

In another embodiment, the sender device, such as the sub systems (310A)-(310Z), may set the audio mixing weight for the audio in the immersive media content to be higher than audio mixing weights for overlay audios in the overlay media streams. The audio mixing parameters (audio mixing weights) can be transmitted from the sender device to the network based media processing server (340) via SDP signaling.

In some examples, for example when the end user devices may not have enough processing capacity, the network based media processing server (340) may send the same audio streams to multiple end user devices.

In some examples, for example when audio mix parameters are user defined or user customized, individual audio streams may be encoded for each user device by the sender device or by the network based media processing server (340). In an example, the audio mix parameters may be based on the user's field of view (FoV) for e.g., the audio streams for the overlays which lie within the FoV may be mixed with more loudness as compared to the other streams. The audio mixing parameters (audio mixing weights) can be negotiated by the sender device, the user device and the network based media processing server (340) via SDP signaling.

In an embodiment, for example, when the end device supports multimedia telephony service for internet protocol multimedia subsystem (MTSI), but does not support MTSI immersive teleconferencing and telepresence for remote terminals (ITT4RT), the network based media processing server (340) may mix both audios and videos to generate mixed audio and video, and provide media stream that carries the mixed audio and video to the end user device, thereby providing backward compatibility for MTSI terminals.

In another embodiment, for example, when an end device's capability is limited, the network based media processing server (340) may mix both audios and videos to generate mixed audio and video, and provide media stream that carries the mixed audio and video to the end user device.

In another embodiment, when the network based media processing server (340) has limited capabilities, and some end user devices are MSTI devices with limited capabilities, the network based media processing server (340) can mix both audios and videos from the same sender device to generate mixed audio and video, and provide media stream that carries the mixed audio and video to the end user devices that are MSTI devices with limited capabilities.

In another embodiment, the network based media processing server (340) can negotiate with all or a subset of the end user devices that are MSTI devices a set of common configuration for audio mix using SDP signaling. The set of common configuration is for a single video composition of immersive media and various overlay media. Then, based on the set of common configuration, the network based media processing server (340) can perform audio mix and/or video mix to generate the mixed audio and video, and provide a media stream that carries the mixed audio and video to all or the subset of the end devices that are MSTI devices.

Figure 4:
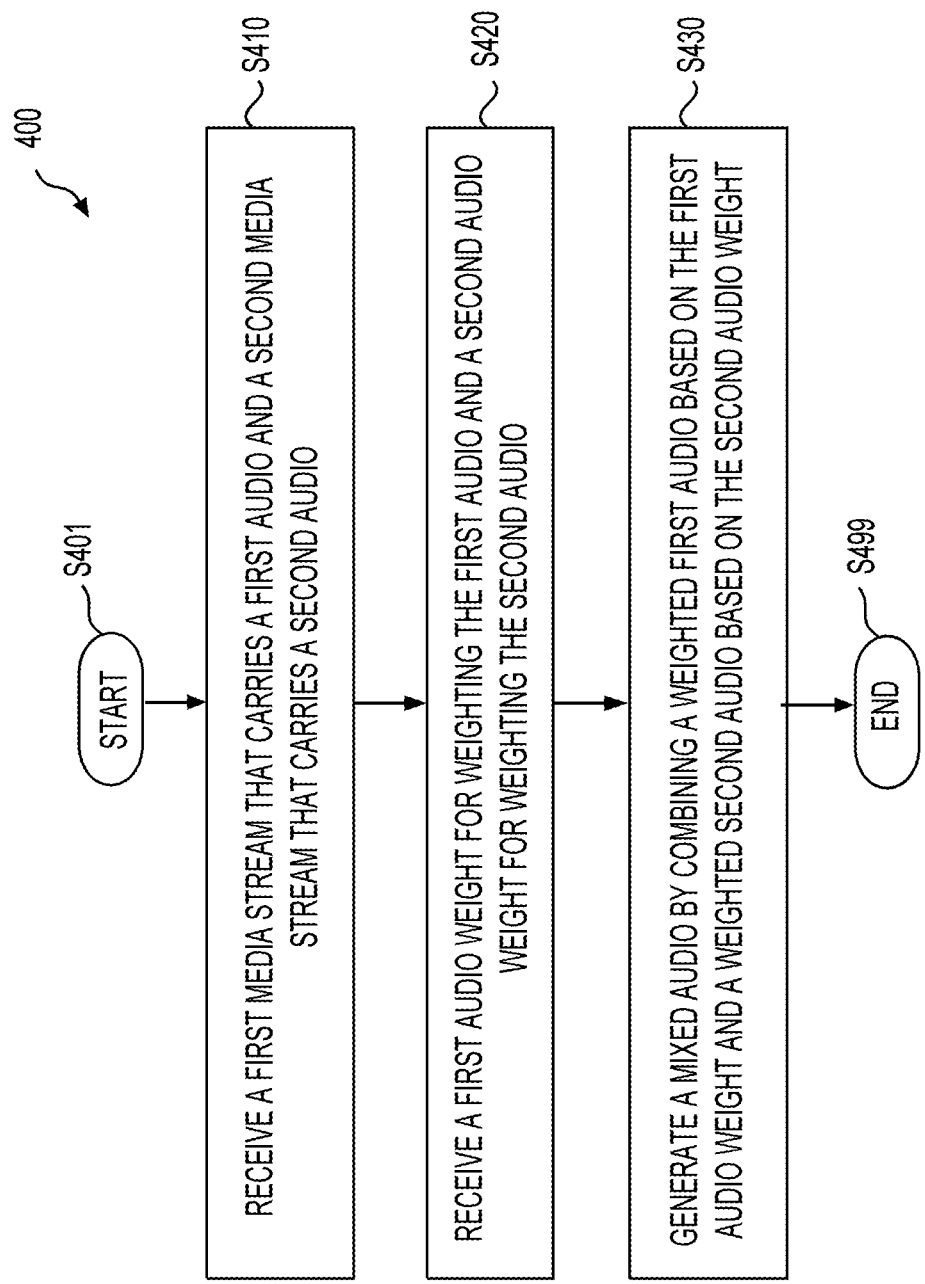
FIG. 4 shows a flow chart outlining a process according to some examples of the disclosure.

FIG. 4 shows a flow chart outlining a process (400) according to an embodiment of the disclosure. In various embodiments, the process (400) can be executed by processing circuitry in a device, such as the processing circuitry in the user device (120), the user device (130), the user device (220), the user device (230), the user device (320), the user device (330), the network based media processing server (340) and the like. In some embodiments, the process (400) is implemented in software instructions, thus when the processing circuitry executes the software instructions, the processing circuitry performs the process (400). The process starts at (S401) and proceeds to (S410).

At (S410), a first media stream carrying a first audio and a second media stream carrying a second audio are received.

At (S420), a first audio weight for weighting the first audio and a second audio weight for weighting the second audio are received.

At (S430), a weighted first audio based on the first audio weight and a weighted second audio based on the second audio weight are combined to generate a mixed audio.

In some examples, the device is a user device, and the processing circuitry of the user device receives the first audio weight and the second audio weight that are determined by for example, a host device for immersive content (e.g., the sub systems (110), (210A)-(210Z), (310A)-(310Z)), the user device can play the mix audio through a speaker associated with the user device. In an example, in order to customize the audio weights, the user device can send customization parameters to the host device for the host device customizing the first audio weight and the second audio weight based on the customization parameters.

In some examples, the host device can determine the first audio weight and the second audio weight based on sound intensities of the first audio and the second audio.

In some examples, the first audio and the second audio are overlay audios, and the host device can determine the first audio weight and the second audio weight based on overlay priorities of the first audio and the second audio.

In some examples, the host device can determine the first audio weight and the second audio weight based on a detection of an active speaker.

In some examples, the first media stream includes immersive media content, the second media stream corresponds to overlay media content, and the host device can determine the first audio weight to be different from the second audio weight.

In some embodiments, the process (400) is performed by the network based media processing server that performs media processing offloaded from user devices. The network based media processing server can encode the mixed audio into a third media stream, and transmit the third media stream to a user device. In some examples, the process (400) is performed by the network based media processing server that performs overlay media processing offloaded from user devices. The network based media processing server can transmit the third media stream and a fourth media stream including immersive media content. The third media stream includes overlay media content to the immersive media content.

Then the process proceeds to (S499) and terminates.

Figure 5:
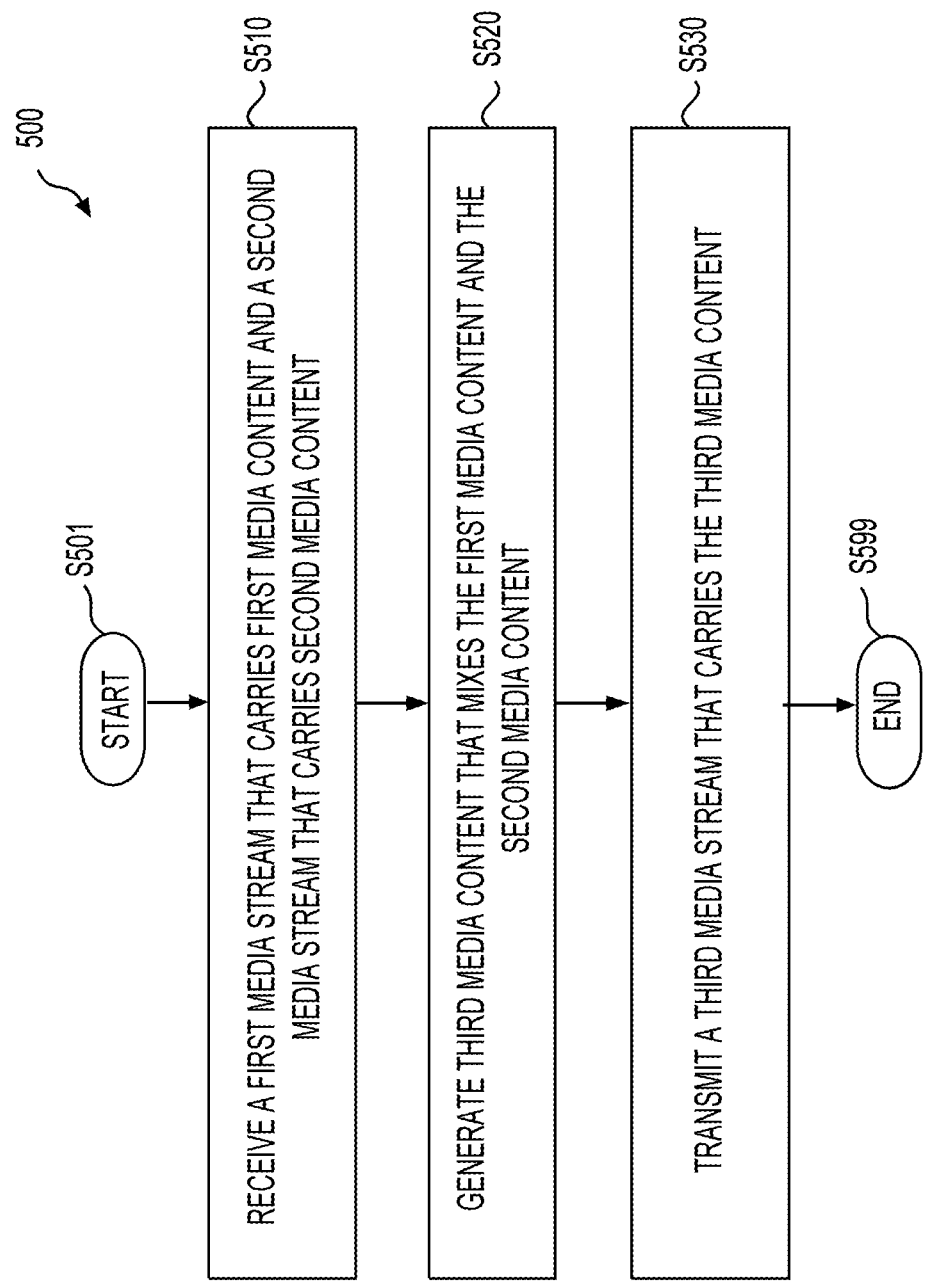
FIG. 5 shows a flow chart outlining a process according to some examples of the disclosure.

FIG. 5 shows a flow chart outlining a process (500) according to an embodiment of the disclosure. In various embodiments, the process (500) can be executed by processing circuitry in a device for network based media processing, such as the network based media processing server (340) and the like. In some embodiments, the process (500) is implemented in software instructions, thus when the processing circuitry executes the software instructions, the processing circuitry performs the process (500). The process starts at (S501) and proceeds to (S510).

At (S510), a first media stream carrying first media content and a second media stream carrying second media content are received.

At (S520), third media content that mixes the first media content and the second media content is generated.

In some examples, a first audio in the first media content is mixed with a second audio in the second media content to generate a third audio. The first audio is weighed based on a first audio weight assigned to the first audio and the second audio is weighted based on a second audio weight assigned to the second audio. In an example, the first audio weight and the second audio weight are determined by a host device that provides immersive media content and are sent from the host device to the network based media processing server.

In an example, the first media stream is an immersive media stream and the second media stream is an overlay media stream, then the first audio weight and the second audio weight that are of different values.

In an example, the first media stream and the second media stream are overlay media streams, the first audio weight and the second audio weight of an equal value.

In another example, the first media stream and the second media stream are overlay media streams, the first audio weight and the second audio weight are depend on overlay priorities of the first media stream and the second media stream.

At (S530), a third media stream that carries the third media content is transmitted to a user device.

Then the process proceeds to (S599) and terminates.

Figure 6:
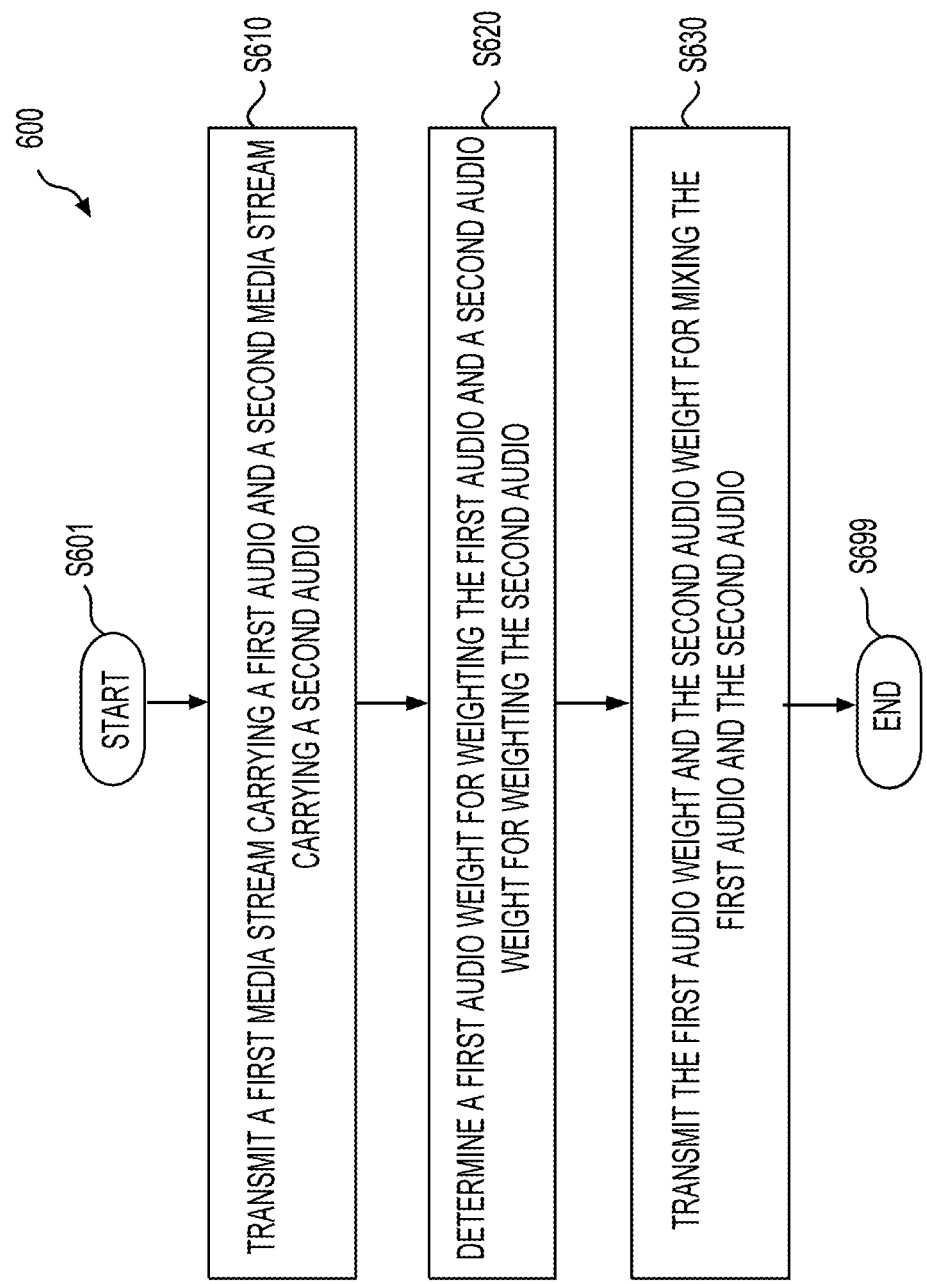
FIG. 6 shows a flow chart outlining a process according to some examples of the disclosure.

FIG. 6 shows a flow chart outlining a process (600) according to an embodiment of the disclosure. In various embodiments, the process (600) can be executed by processing circuitry in a host device for immersive media content, such as the processing circuitry in the sub systems (110), (210A)-(210Z), (310A)-(310Z), and the like. In some embodiments, the process (600) is implemented in software instructions, thus when the processing circuitry executes the software instructions, the processing circuitry performs the process (600). The process starts at (S601) and proceeds to (S610).

At (S610), a first media stream carrying a first audio and a second media stream carrying a second audio are transmitted.

At (S620), a first audio weight for weighting the first audio and a second audio weight for weighting the second audio are determined.

In some examples, the host device receives customization parameters based on session description protocol and determine the first audio weight and the second audio weight based on the customization parameters.

In some examples, the host device determines the first audio weight and the second audio weight based on sound intensities of the first audio and the second audio.

In some examples, the first audio and the second audio are overlay audios, and the host device can determine the first audio weight and the second audio weight based on overlay priorities of the first audio and the second audio.

In some examples, the host device determines the first audio weight and the second audio weight based on a detection of an active speaker in one of the first audio and the second audio.

In some examples, the first media stream includes immersive media content, the second media stream includes overlay media content, and the host device determines different values for the first audio weight and the second audio weight.

At (S630), the first audio weight and the second audio weight are transmitted for mixing the first audio with the second audio.

Then the process proceeds to (S699) and terminates.

The techniques described above, can be implemented as computer software using computer-readable instructions and physically stored in one or more computer-readable media. For example, FIG. 7 shows a computer system (700) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), and the like.

The instructions can be executed on various types of computers or components thereof, including, for example, personal computers, tablet computers, servers, smartphones, gaming devices, internet of things devices, and the like.

Figure 7:
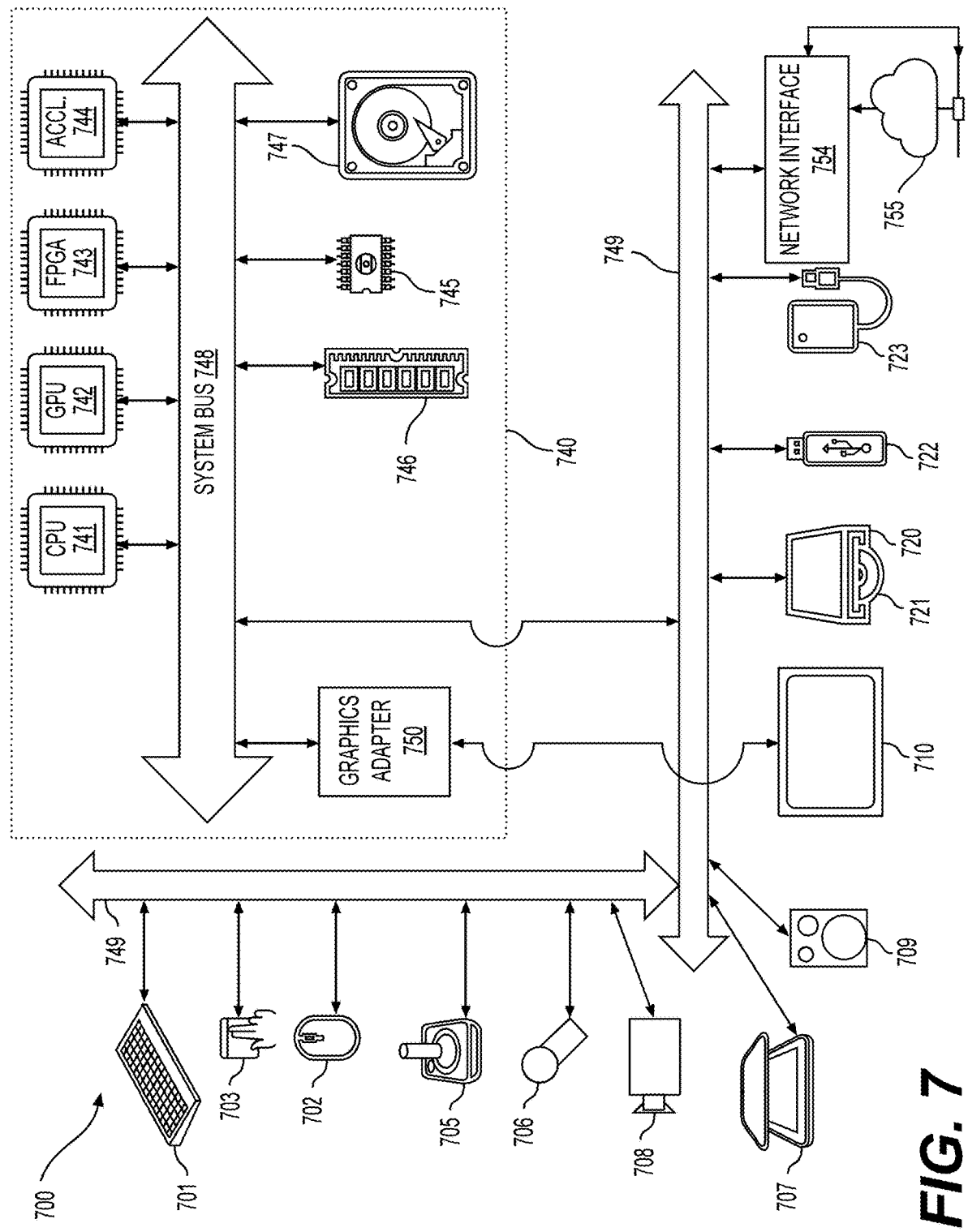
FIG. 7 is a schematic illustration of a computer system in accordance with an embodiment.

The components shown in FIG. 7 for computer system (700) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (700).

Computer system (700) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (701), mouse (702), trackpad (703), touch screen (710), data-glove (not shown), joystick (705), microphone (706), scanner (707), camera (708).

Computer system (700) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (710), data-glove (not shown), or joystick (705), but there can also be tactile feedback devices that do not serve as input devices), audio output devices (such as: speakers (709), headphones (not depicted)), visual output devices (such as screens (710) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (700) can also include human accessible storage devices and their associated media such as optical media including CD/DVD ROM/RW (720) with CD/DVD or the like media (721), thumb-drive (722), removable hard drive or solid state drive (723), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (700) can also include an interface (754) to one or more communication networks (755). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (749) (such as, for example USB ports of the computer system (700)); others are commonly integrated into the core of the computer system (700) by attachment to a system bus as described below (for example Ethernet interface into a PC computer system or cellular network interface into a smartphone computer system). Using any of these networks, computer system (700) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (740) of the computer system (700).

The core (740) can include one or more Central Processing Units (CPU) (741), Graphics Processing Units (GPU) (742), specialized programmable processing units in the form of Field Programmable Gate Areas (FPGA) (743), hardware accelerators for certain tasks (744), graphics adapters (750), and so forth. These devices, along with Read-only memory (ROM) (745), internal mass storage such as internal non-user accessible hard drives, SSDs, and the like (747), may be connected through a system bus (748). In some computer systems, the system bus (748) can be accessible in the form of one or more physical plugs to enable extensions by additional CPUs, GPU, and the like. The peripheral devices can be attached either directly to the core's system bus (748), or through a peripheral bus (749). In an example, the screen (710) can be connected to the graphics adapter (750). Architectures for a peripheral bus include PCI, USB, and the like.

CPUs (741), GPUs (742), FPGAs (743), and accelerators (744) can execute certain instructions that, in combination, can make up the aforementioned computer code. That computer code can be stored in ROM (745) or RAM (746). Transitional data can be also be stored in RAM (746), whereas permanent data can be stored for example, in the internal mass storage (747). Fast storage and retrieve to any of the memory devices can be enabled through the use of cache memory, that can be closely associated with one or more CPU (741), GPU (742), mass storage (747), ROM (745), RAM (746), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system (700) having architecture shown in FIG. 7, and specifically the core (740) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (740) that are of non-transitory nature, such as core-internal mass storage (747) or ROM (745). The software implementing various embodiments of the present disclosure can be stored in such devices and executed by core (740). A computer-readable medium can include one or more memory devices or chips, according to particular needs. The software can cause the core (740) and specifically the processors therein (including CPU, GPU, FPGA, and the like) to execute particular processes or particular parts of particular processes described herein, including defining data structures stored in RAM (746) and modifying such data structures according to the processes defined by the software. In addition or as an alternative, the computer system can provide functionality as a result of logic hardwired or otherwise embodied in a circuit (for example: accelerator (744)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method for teleconference, comprising:
receiving, by processing circuitry of a first device and from a second device, a first media stream that carries a first audio, and a second media stream that carries a second audio;
receiving, from the second device, a first audio weight for weighting the first audio and a second audio weight for weighting the second audio, wherein the first audio weight and the second audio weight are different from each other and determined based on at least one of (i) content of the first audio and content of the second audio or (ii) received customization parameters; and
generating, by the processing circuitry of the first device, a mixed audio by combining a weighted first audio based on the first audio weight and a weighted second audio based on the second audio weight.

2. The method of claim 1, further comprising:
playing, through a speaker associated with the first device, the mixed audio.

3. The method of claim 1, further comprising:
sending the customization parameters to the second device for customizing the first audio weight and the second audio weight based on the customization parameters.

4. The method of claim 1, further comprising:
receiving the first audio weight and the second audio weight that are determined by the second device based on sound intensities of the first audio and the second audio.

5. The method of claim 1, wherein the first audio and the second audio are overlay audios, and the method comprises:
receiving the first audio weight and the second audio weight that are determined by the second device based on overlay priorities of the first audio and the second audio.

6. The method of claim 1, further comprising:
receiving the first audio weight and the second audio weight that are adjusted by the second device based on a detection of an active speaker.

7. The method of claim 1, wherein the first media stream includes immersive media content, the second media stream includes overlay media content to the immersive media content, and the first audio weight is different from the second audio weight.

8. The method of claim 1, further comprising:
encoding, by the processing circuitry, the mixed audio into a third media stream; and
transmitting, via interface circuitry of the first device, the third media stream to a third device.

9. The method of claim 8, further comprising:
transmitting, via the interface circuitry of the first device, the third media stream and a fourth media stream that includes immersive media content, the third media stream being an overlay media stream to the fourth media stream.

10. A method for teleconference, comprising:
receiving, by processing circuitry of a first device, a first media stream that carries first media content of a teleconference session and a second media stream that carries second media content of the teleconference session;
mixing, by the processing circuitry of the first device, a first audio in the first media content with a second audio in the second media content to generate a third audio based on a first audio weight assigned to the first audio and a second audio weight assigned to the second audio, the third audio being included in third media content that mixes the first media content and the second media content, wherein the first audio weight and the second audio weight are different from each other and determined based on at least one of (i) content of the first audio and content of the second audio or (ii) received customization parameters; and
transmitting, via transmitting circuitry of the first device, a third media stream that carries the third media content to a second device.

11. The method of claim 10, wherein the first media stream includes immersive media content and the second media stream includes overlay media content to the immersive media content.

12. The method of claim 10, wherein the first media stream and the second media stream are overlay media streams.

13. The method of claim 10, wherein the first media stream and the second media stream are overlay media streams, the method further comprises:

mixing, by the processing circuitry of the first device, the first audio with the second audio based on the first audio weight and the second audio weight that are associated with overlay priorities of the first media stream and the second media stream.

14. A method for teleconference, comprising:
transmitting, by a first device and to a second device, a first media stream that carries a first audio and a second media stream that carries a second audio;
determining, by the first device, a first audio weight for weighting the first audio and a second audio weight for weighting the second audio, wherein the first audio weight and the second audio weight are different from each other and determined based on at least one of (i) content of the first audio and content of the second audio or (ii) received customization parameters; and
transmitting, by the first device and to the second device, the first audio weight and the second audio weight for mixing the first audio and the second audio.

15. The method of claim 14, comprising:
receiving the customization parameters based on session description protocol; and
determining the first audio weight and the second audio weight based on the customization parameters.

16. The method of claim 14, further comprising:
determining the first audio weight and the second audio weight based on sound intensities of the first audio and the second audio.

17. The method of claim 14, wherein the first audio and the second audio are overlay audios, and the method comprises:
determining the first audio weight and the second audio weight based on overlay priorities of the first audio and the second audio.

18. The method of claim 14, further comprising:
determining the first audio weight and the second audio weight based on a detection of an active speaker in one of the first audio and the second audio.

19. The method of claim 14, wherein the first media stream includes immersive media content, the second media stream includes overlay media content, and the method further comprises:
determining different values for the first audio weight and the second audio weight.

* * * * *